United States Patent [19]

Harwood

[11] Patent Number: 5,563,385
[45] Date of Patent: Oct. 8, 1996

[54] STAMP FORMED MUFFLER WITH SIPHON TUBE

[75] Inventor: Jon W. Harwood, Toledo, Ohio

[73] Assignee: AP Parts Manufacturing Company, Toledo, Ohio

[21] Appl. No.: 399,780

[22] Filed: Mar. 7, 1995

[51] Int. Cl.⁶ .................................................. F01N 7/18
[52] U.S. Cl. ........................... 181/282; 181/272; 181/276
[58] Field of Search .................................... 181/282, 272, 181/276

[56] References Cited

U.S. PATENT DOCUMENTS

| | | |
|---|---|---|
| 2,717,049 | 9/1955 | Langford . |
| 2,818,131 | 12/1957 | Doughty . |
| 2,824,619 | 2/1958 | Bremer et al. . |
| 3,638,756 | 2/1972 | Thiele ........................................ 181/282 |
| 3,831,377 | 8/1974 | Morin . |
| 4,249,375 | 2/1981 | Grundmann et al. . |
| 4,700,806 | 10/1987 | Harwood . |
| 4,736,817 | 4/1988 | Harwood . |
| 4,759,423 | 7/1988 | Harwood et al. . |
| 4,760,894 | 8/1988 | Harwood et al. . |
| 4,765,437 | 8/1988 | Harwood et al. . |
| 4,836,330 | 6/1989 | Harwood et al. . |
| 4,842,096 | 6/1989 | Fujitsubo . |
| 4,847,965 | 7/1989 | Harwood et al. . |
| 4,860,853 | 8/1989 | Moring, III . |
| 4,865,154 | 9/1989 | Hanson et al. ............................ 181/282 |
| 4,894,987 | 1/1990 | Harwood et al. . |
| 4,901,815 | 2/1990 | Harwood et al. . |
| 4,901,816 | 2/1990 | Gary . |
| 4,905,791 | 3/1990 | Gary . |
| 4,909,348 | 3/1990 | Harwood et al. . |
| 4,928,372 | 5/1990 | Harwood et al. . |
| 4,941,545 | 7/1990 | Wilcox et al. ............................ 181/282 |
| 5,004,069 | 4/1991 | Van Blaircum et al. . |
| 5,042,125 | 8/1991 | Harwood et al. . |
| 5,164,551 | 11/1992 | Harwood et al. . |
| 5,173,577 | 12/1992 | Clegg et al. . |
| 5,252,788 | 10/1993 | Emrick et al. . |

FOREIGN PATENT DOCUMENTS 2134979  8/1984  United Kingdom .

*Primary Examiner*—Khanh Dang
*Attorney, Agent, or Firm*—Anthony J. Casella; Gerald E. Hespos

[57] ABSTRACT

A muffler is formed substantially from stamped components to include an array of flow tubes and a plurality of chambers communicating with selected flow tubes. The chambers are provided with siphon tube mounting grooves that extend between a plurality of the chambers. The grooves are disposed to lie at gravitational low points of the muffler. The muffler further includes a siphon tube closely engaged by the grooves and extending from the gravitational low points of the chambers into a downstream flow tube of the muffler. Pressure differentials in the flowing exhaust gas will cause condensate in the chambers to be sucked through the siphon tube and evacuated from the muffler.

15 Claims, 5 Drawing Sheets

STAMP FORMED MUFFLER WITH SIPHON TUBE

BACKGROUND OF THE INVENTION

1. Field of the Invention.

The invention relates to a stamp formed muffler with a siphon tube for evacuating moisture from chambers of the muffler.

2. Description of the Prior Art.

The prior art exhaust system of a vehicle includes a muffler to attenuate the noise associated with the flowing exhaust gas. Exhaust gases produced by an engine include vaporized liquids. These vapors in the exhaust gas condense as the gas cools. Some such condensation occurs in the muffler while the vehicle is operating due to the cooling that occurs as the exhaust gas travels further distances from the engine. Additionally, vapor in the muffler condenses when the engine is turned off. Condensate in a muffler will flow to the gravitational low point of the muffler or to the gravitational low point of each chamber in the muffler. This condensate can accumulate at these low points and can lead to an accelerated corrosion or rusting of the outer shell or the baffles of the prior art muffler.

Corrosion caused by condensate in a muffler often is avoided by merely placing a hole through the outer shell approximately at the gravitational low point of each chamber. The holes are intended to permit gravitational outflow of condensate before damage to the muffler occurs. Holes generally work well. However many new car manufacturers prefer not to provide new equipment with a hole. Furthermore, there is a concern that moisture passing through the hole will wick into the space between the outer shell and the outer wrapper. This moisture may not drain well and can accelerate corrosion. There also is a concern that particulates in the exhaust gas will combine with the condensate to form a sludge that may block the hole and render the hole inoperative.

Some prior art mufflers have been provided with a porous material that is intended to absorb moisture vapor before the vapor can condense.

Other prior art mufflers have included siphon tubes. Siphon tubes have been employed by drilling or punching an aperture through a flow tube of a prior art muffler. A diametrically smaller siphon tube is then mitered and welded to the flow tube at the aperture and extends down into a chamber of the muffler generally near a gravitational low point. A pressure differential caused by a gradual pressure head loss in the flowing exhaust gas draws moisture condensate from the gravitational low point through the small diameter siphon tube and into the conventional flow tube of the prior art muffler.

An example of a muffler with a siphon tube is shown in published British Patent Appl. GB 2 134 979 A.

Siphon tubes can be effective for evacuating condensate from the chamber into which the siphon tube extends. However, most prior art mufflers include a plurality of chambers separated by baffles. These prior art mufflers have included apertures at the gravitational low point of the baffle to permit fluid to flow gravitationally downwardly into the chamber having the siphon tube. Although prior art mufflers of this type have worked well, it is often desirable to have adjacent chambers structurally and functionally separate from one another. Thus, apertures in baffles may compromise the performance of one or both chambers separated by the baffle.

Mufflers assembled from formed components have received considerable commercial interest in recent years. The typical prior art formed muffler includes a pair of plates formed with channels. The plates are secured in face-to-face relationship such that the channels define flow tubes for carrying exhaust gas. The prior art formed mufflers further include a pair of external shells that are formed to define chambers surrounding the tubes. Each external shell may include an inwardly formed crease that engages the adjacent plate and defines a baffle that effectively divides the external shell into a plurality of structurally and functionally separate chambers.

Formed mufflers are subject to the condensate accumulation that affects conventional mufflers. As a result there is a desire to prevent the accumulation of condensate in formed mufflers. Condensate can effectively be eliminated by apertures through the external shell at the gravitational low point of each chamber. However, as noted above, new car manufacturers often will not allow apertures through their mufflers. Additionally, stamp formed mufflers often are provided with laminated shells, and apertures create the potential for a wicking of moisture into the space between the laminated shells. The mitering and welding of tubes required to incorporate siphons into conventional mufflers is not well suited to the automated manufacturing and assembly techniques used for stamped mufflers. Thus the prior art siphon tube technology would offset many of the manufacturing efficiencies provided with stamp formed mufflers. Additionally, the inwardly formed baffle creases of prior art stamp formed mufflers are not well suited to apertures that would permit a gravitational down flow of condensate into the gravitationally lowest chamber for evacuation by a siphon tube. Separate siphon tubes to each chamber of a stamp formed muffler would be costly and would further complicate manufacturing.

In view of the above, it is an object of the subject invention to provide a stamp formed muffler with a siphon tube for evacuating moisture from at least one chamber.

It is another object of the subject invention to provide a muffler with plural formed components and with a siphon for evacuating condensate from a plurality of chambers.

SUMMARY OF THE INVENTION

The subject invention is directed to a muffler assembled substantially from formed sheets. The muffler includes top and bottom internal plates that are formed to define channels. The top and bottom internal plates are secured in face-to-face relationship with one another such that the channels define gas passages or flow tubes between the plates. The flow tubes include at least one inlet tube and at least one outlet tube that communicate respectively with the inlet and outlet of the muffler. Selected flow tubes may be formed with perforations, louvers or the like to permit communication between the flow tubes and surrounding portions of the muffler. The top and bottom internal plates may further be formed to define top and bottom internal chambers that communicate with the flow tubes formed by the internal plates. The top internal chamber may have a smoothly arcuately convex exterior surface. The bottom internal chamber also may have a substantially arcuately convex exterior surface. However, the exterior surface of the bottom internal chamber may include a concave groove disposed at a location that will substantially coincide with the gravitational low point on the assembled muffler.

The muffler may further include at least one flow tube bridging the top and bottom internal chambers and communicating with flow tubes formed by the top and bottom internal plates. The flow tube bridging the internal chambers may be a conventional tube as shown in U.S. Pat. No. 5,252,788 which is assigned to the assignee of the subject invention. Alternatively, flow tubes bridging the internal chamber may be defined by a pair of sheets that are formed to define channels. The sheets may be secured in face-to-face relationship such that the channels define stamp formed flow tubes. These sheets may be secured between the top and bottom internal plates such that the flow tubes formed by the sheets bridge the internal chamber and communicate with the flow tubes formed by the top and bottom internal plates. A muffler of this general type is shown in applicants copending application Ser. No. (AP-170-172).

As an alternative to the above described design, the top and bottom internal plates of the muffler may be formed to define only flow tubes. The muffler of this alternate embodiment may further include top and bottom internal shells that are formed to define internal chambers that surround selected portions of the flow tubes defined by the top and bottom internal plates. A muffler of this basic design also is shown in the above referenced copending application Ser. No. (AP-170-172). The top internal chamber defined by the top internal shell may have a continuously arcuately convex exterior surface. However, the exterior surface of the bottom internal shell may have a concave groove at a location substantially coinciding with a gravitational low point on the muffler.

The muffler of the subject invention further includes top and bottom external shells. The top external shell is formed to surround both the channels in the top internal plate and to closely engage the top internal chamber. Thus, the top internal chamber functions as a baffle which divides the top external shell into two structurally and functionally separate top external chambers.

The bottom external shell similarly is formed to surround the channels in the bottom internal plate and to closely engage portions of the bottom internal chamber. Thus, the bottom internal chamber will substantially function as a baffle which divides the bottom external shell into two separate external chambers. However, the bottom external shell is not configured to nest perfectly with the bottom internal chamber. Rather, the bottom internal chamber and the bottom external shell are formed to define a siphon tube passage extending between the otherwise separate bottom external chambers.

The muffler of the subject invention further includes a siphon tube mounted in the siphon tube passage formed by the bottom internal chamber and the bottom external shell. The siphon tube includes an open end at the gravitational low point of one bottom external chamber. The siphon tube then continues through the siphon tube passage and into the other bottom external chamber. Portions of the siphon tube at the gravitational low point of one bottom external chamber may have an aperture. The siphon tube then continues into communication with a flow tube of the muffler. For example, the siphon tube may extend to a flow tube formed by the internal plates and near the outlet of the muffler. The siphon tube may be a small diameter conventional tube with a flange configured to seat efficiently in the flow tube of the muffler. Alternatively, the siphon tube may be bent to point generally in a downstream direction in the flow tube. The bend in the siphon tube is disposed and configured to securely position and engage the formed flow tube. The muffler of the subject invention attenuates noise associated with flowing exhaust gas substantially as described in the above referenced copending application Ser. No. (AP-170-172). Additionally, the siphon tube communicates with any moisture condensate at the gravitational low points of the bottom external chambers. Pressure differentials between these gravitational low points in the chambers and the portions of the siphon tube in the flow tube cause the moisture to be drawn into the flowing exhaust gas stream and out of the muffler.

DETAILED DESCRIPTION OF THE PREFERRED EMBODIMENTS

Figure 1:
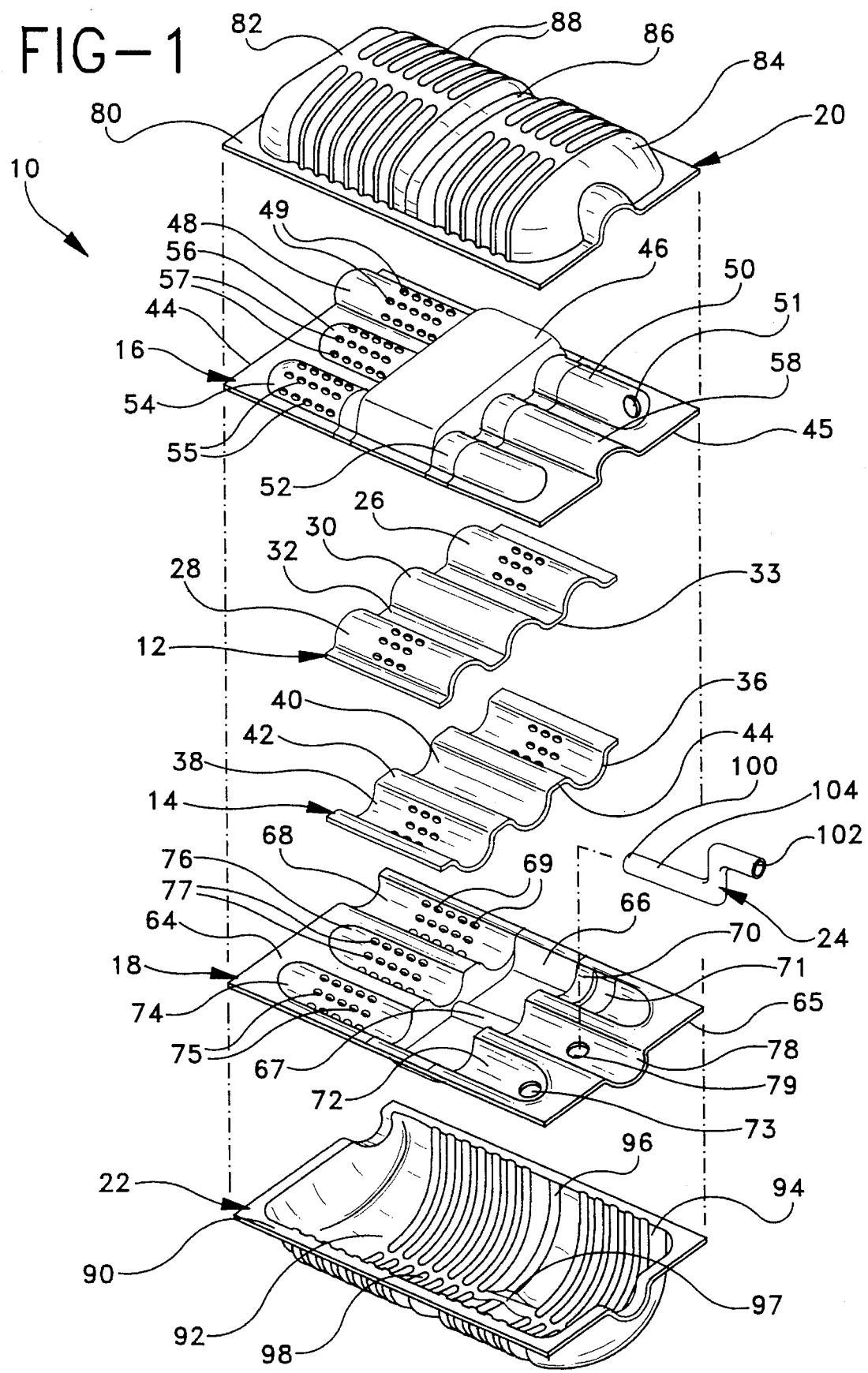
FIG. 1 is an exploded perspective view of a muffler in accordance with the subject invention.
Figure 2:
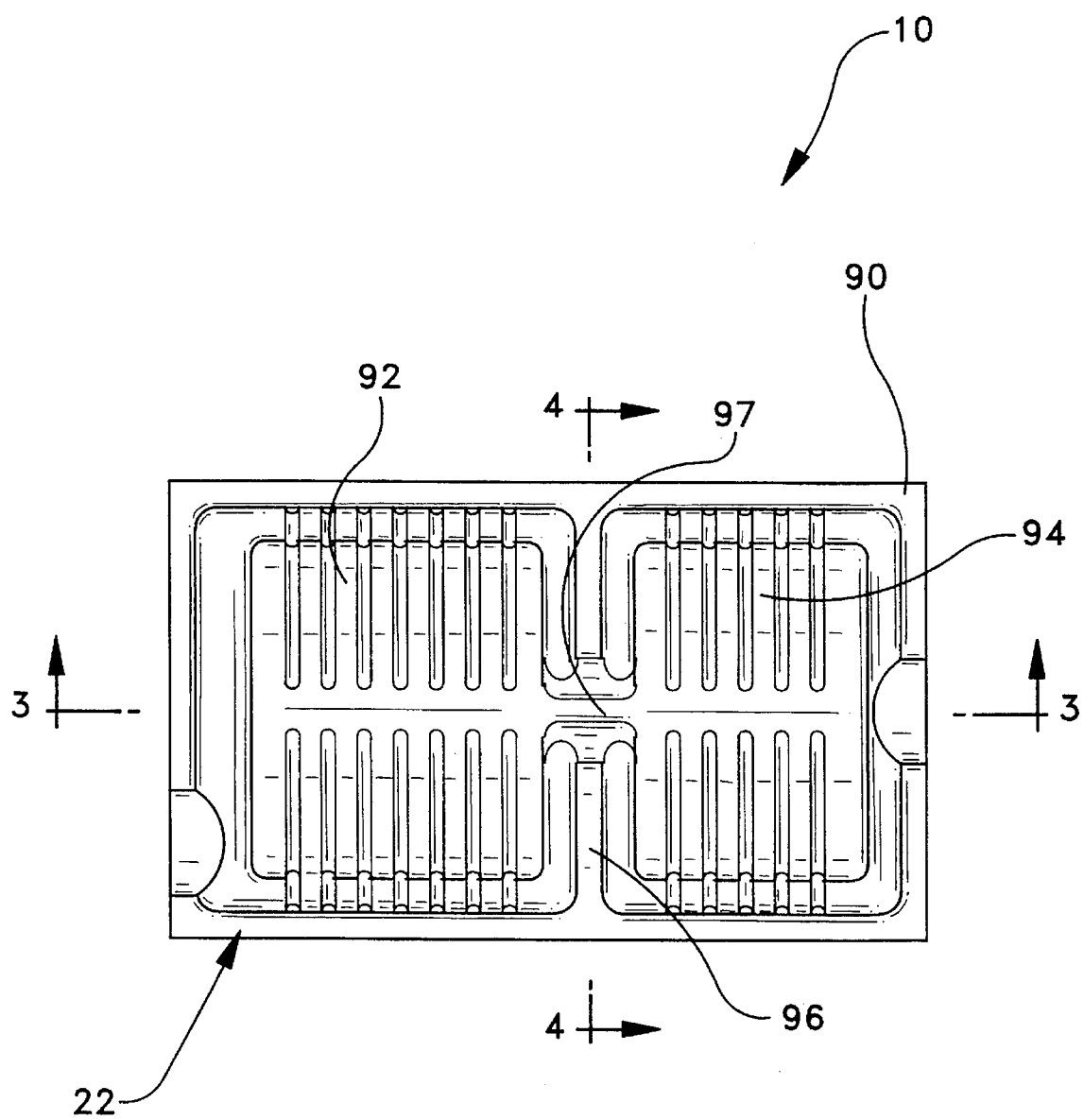
FIG. 2 is a bottom plan view of the muffler shown in FIG.
Figure 3:
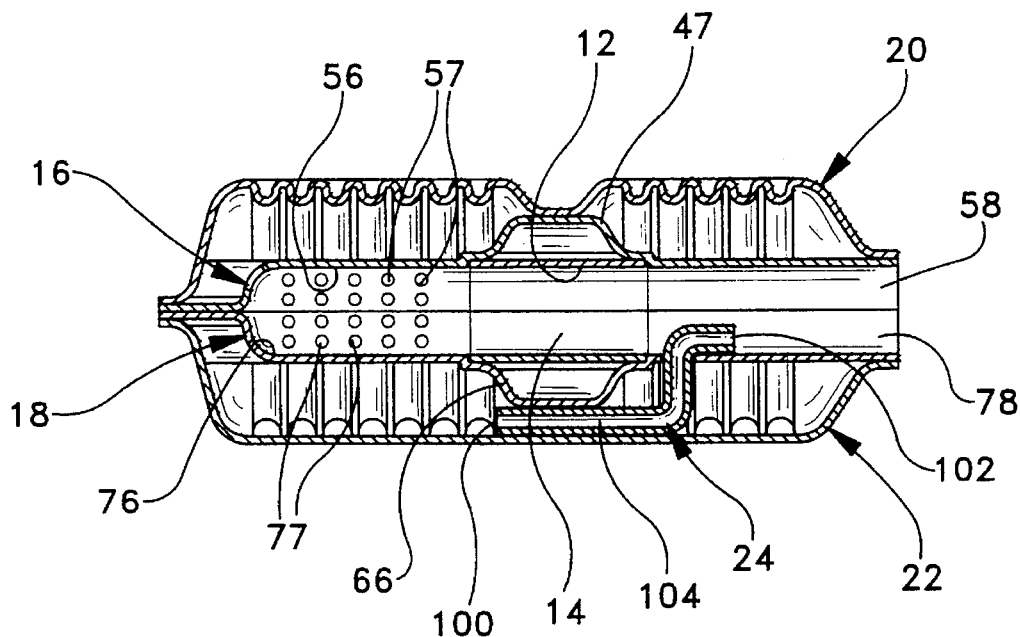
FIG. 3 is a cross-sectional view taken along line 3—3 in FIG. 2.
Figure 4:
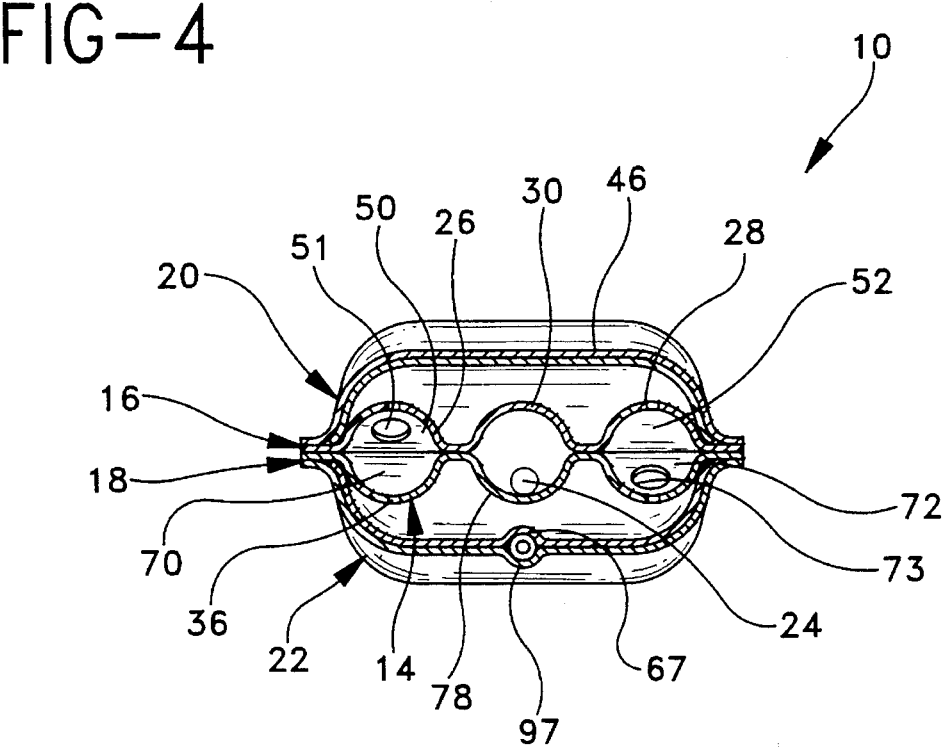
FIG. 4 is a cross-sectional view taken along line 4—4 in FIG. 2.

A muffler in accordance with the subject invention is identified generally by the numeral 10 in FIGS. 1–4. The muffler 10 includes top and bottom internal sheets 12 and 14 respectively, top and bottom internal plates 16 and 18 respectively, top and bottom external shells 20 and 22 respectively and a siphon tube 24. The top internal sheet 12 is formed to define first, second and third channels 26, 28 and 30 which are generally parallel to one another and which are separated by connecting portions 32 and 33. The bottom internal sheet 14 similarly is formed with first, second and third channels 36, 38 and 40 and connecting portions 42 and 43 respectively. The channels in the internal sheets 12 and 14 are disposed to substantially register with one another. Thus, the top and bottom internal sheets 12 and 14 can be secured together at connecting portions 32, 33, 42 and 43 such that the channels 26, 28 and 30 register with the channels 36, 38 and 40 to define flow tubes.

The top internal plate 16 includes opposed upstream and downstream ends 44 and 45 respectively, and is formed with an internal chamber 46 between and spaced from the ends 44 and 45. The top internal chamber 46 has an upwardly facing exterior surface that is continuously arcuately convex from side-to-side. The top internal plate 16 also is formed to include an inlet channel 48 extending from the inlet end 44 to the internal chamber 46. The inlet channel 48 is formed to include an array of perforations 49. A first downstream flow channel 50 extends from the internal chamber 46 toward the downstream end 45 of the internal plate 16. The first downstream flow channel 50 includes an aperture 51 at the end thereof most distant from the internal chamber 46. A second downstream flow channel 52 extends from a location near the downstream end 45 of the top internal plate 16 back toward the internal chamber 46. The second downstream flow channel 52 is free of apertures. A first upstream flow channel 54 extends from the internal chamber 46 at a location substantially aligned with the first downstream flow channel 52, and proceeds toward the upstream end 44 of the top internal plate 16. The first upstream flow channel 54 of the top internal plate includes an array of perforations 55. A second upstream flow channel 56 extends from the upstream end 44 of the top internal plate 16 back toward the internal chamber 46. The second upstream channel 56 also includes an array of perforations 57. An outlet channel 58 is substantially aligned with the second upstream flow channel 56 and extends from the internal chamber 46 entirely to the downstream end 45 of the top internal plate 16. The outlet channel 56 is free of perforations.

The bottom internal plate 18 is almost a mirror image of the top internal plate 16. In particular, the bottom internal plate 18 includes opposed upstream end downstream ends 64 and 65. An internal chamber 66 is disposed intermediate and spaced from the ends 64 and 65. The internal chamber 66 is similar to the internal chamber 46 in that it has downwardly facing exterior surface that is substantially arcuately convex from side-to-side. However, unlike the top internal plate 16, the internal chamber 66 of the bottom internal plate 18 includes a siphon tube mounting groove 67 extending entirely thereacross in an upstream to downstream direction. The bottom internal plate 18 also is formed to include an array of channels, including an inlet channel 68 which extends from the upstream end 64 to the internal chamber 66. The inlet channel 68 is provided with an array of perforations 69. A first downstream flow channel 70 extends from the internal chamber 66 toward the downstream end 65 of the bottom internal plate 18. The first downstream flow channel 70 includes an aperture 71 at a selected location intermediate the length of the channel 70. A second downstream flow channel 72 extends from a location near the downstream end 65 of the bottom internal plate to the internal chamber 66. The second downstream flow channel 72 is provided with an aperture 73 substantially adjacent the downstream end thereof. A first upstream flow channel 74 extends from the internal chamber 66 toward the upstream end 64 of the bottom internal plate 18. The first upstream flow channel 74 is provided with an array of perforations 75. A second upstream flow channel 76 extends from a location near the upstream end 64 of the bottom internal plate 18 back toward the internal chamber 16. The second upstream flow channel 76 is provided with an array of perforations 77. An outlet channel 78 extends from the internal chamber 66 entirely to the downstream end 65 of the bottom internal plate 18. The outlet channel 78 has a siphon tube mounting aperture 79.

The top external shell 20 includes a peripheral flange 80 configured and dimensioned to substantially register with peripheral regions of the top internal plate 16. The top external shell is further formed to include a top upstream external chamber 82, a top downstream external chamber 84 and a connecting portion 86 therebetween. The connecting portion 86 of the top external shell 20 is continuously arcuately convex from side-to-side, and is configured and dimensioned to mate closely with the arcuate outer surfaces of the internal chamber 46 on the top internal plate 16. Reinforcing ribs or grooves 88 are formed in the top external shell, and may extend continuously across each chamber 82 or 84 without interruption.

The bottom external shell 22 includes a peripheral flange 90 dimensioned and configured to register with peripheral regions of the bottom internal plate 18. The bottom external shell 22 is further formed to define a bottom upstream external chamber 92, a bottom downstream external chamber 94 and a connecting portion 96 therebetween. The connecting portion 96 is substantially convexly arcuate from side-to-side when viewed from the bottom of the bottom external shell. This arcuate configuration is dimensioned and configured to engage the convex arcuate portions of the internal chamber 66 in the bottom internal plate 18. The connecting portion 96 of the bottom external shell 22 is similar to the connecting portion 86 of the top external shell 20. However, the connecting portion 96 on the bottom external shell 22 is characterized by a siphon tube mounting a groove 97 extending in an upstream to downstream direction at the gravitational low point of the muffler 10 and connecting the bottom upstream external chamber 92 and the bottom downstream external chamber 94. The siphon tube mounting groove 97 is concave when viewed from the top or interior of the bottom external shell 22 and convex when viewed from the bottom or exterior of the bottom external shell 22. Additionally, as explained further below, the siphon tube mounting groove 97 is disposed to substantially register with the siphon tube mounting groove 67 in the internal chamber 66. The bottom external shell 22 is further formed with reinforcing ribs 98 which are functionally similar to the reinforcing ribs 88 in the top external shell 20. However, the reinforcing ribs 98 in the bottom external shell 22 do not extend continuously across the bottom external shell 22. Rather, discontinuities are provided to align with the siphon tube mounting groove 97.

The siphon tube 24 is of conventional tubular construction and of substantially cylindrical shape. The siphon tube 24 includes an upstream end 100 and an opposed downstream end 102. A siphon aperture 104 is formed in the siphon tube 24 intermediate the upstream and downstream ends 100 and 102. The siphon tube 24 is cross-sectionally dimensioned to nest into the siphon tube mounting grooves 67 and 97 as explained further herein.

The muffler 10 may be assembled by initially securing the downstream end 102 of the siphon tube 24 in the siphon tube aperture 79 of the outlet channel 78 of the bottom internal plate 18. Portions of the siphon tube 24 near the upstream end 100 are secured in the siphon tube mounting groove 67 which traverses the internal chamber 66 of the bottom internal plate 18. In this position, the upstream end 100 of the siphon tube 24 lies on the upstream side of the internal chamber 66, while the aperture 104 in the siphon tube 24 lies on the downstream side of the internal chamber 66. The formed sheets 12 and 14 are then secured in face-to-face relationship such that the channels 26, 28 and 30 of the top sheet 12 register with the channels 36, 38 and 40 respectively of the bottom shell 14. These interconnected sheets are then positioned to bridge the internal chamber 66. In this position the upstream ends of the channels 36, 38 and 40 will align with the inlet channel 68, the first upstream channel 74 and the second upstream channel 76 respectively. The downstream ends of the channels 36, 38 and 40 will align respectively with the first downstream channel 70, the second downstream channel 72 and the outlet channel 78. The top internal plate 16 is then secured in face-to-face relationship with the bottom internal plate 18 to substantially enclose the sheets 12 and 14 therebetween and to bridge the internal chambers 46, 66. The top and bottom external shells 20 and 22 are then secured around the interconnected internal plates 16 and 18. In this interconnected state, the siphon tube mounting groove 97 of the bottom internal plate 22 will engage closely around portions of the siphon tube 24 between the upstream end 100 and the aperture 104.

The inlet channels 48 and 68 define an inlet to the muffler that is placed in communication with the exhaust pipe of an exhaust system. Exhaust gas will pass through inlet 48, 68 and into the flow tube defined by the channels 26 and 36 of the top and bottom sheets 12 and 14. Exhaust gas flowing through the flow tube formed by channels 26, 36 is permitted to expand into the internal chambers 46 and 66. Exhaust gas continues into the flow tube defined by the first downstream flow channels 50 and 70. Exhaust gas will flow through the aperture 71 in the flow channel 70 and into the bottom downstream external chamber 94. Exhaust gas also will communicate to the top downstream external chamber 84 through the aperture 51 in the channel 50. In this regard, portions of the tube between the apertures 71 and 51 will function as a tuning tube, and the top downstream external chamber 84 will function as a low frequency resonating chamber. Exhaust gas will expand into the bottom downstream external chamber 94 and will enter the flow tube formed by the second downstream flow channels 52 and 72 through the aperture 73. Exhaust will then travel in an upstream direction through the flow tube formed by the channels 28 and 38 of sheets 12 and 14 respectively. The apertures in the channels 28 and 38 will permit communication of exhaust gas with the internal chambers 46 and 66. Exhaust gas will continue into the flow tube formed by the first upstream flow channels 54 and 74 and will expand through the apertures 55 and 75 into the top and bottom upstream external chambers 82 and 92. Exhaust gas will then enter the flow tube formed by the second upstream flow channels 56 and 76 through the respective apertures 57 and 77 and will continue in a downstream direction. The gas will then enter the flow tube formed by channels 30 and 40 in the sheets 12 and 14 respectively and will continue into the outlet tube formed by the outlet channels 58 and 78. A tailpipe will be connected to the outlet channels 58 and 78 to deliver the exhaust gas to a location where it may be safely emitted from the exhaust system.

As noted above, exhaust gas includes moisture vapor which may condense as the exhaust gas cools at further distances from the engine. Additionally, moisture vapor in exhaust gas when an engine is turned off will cool significantly and will condense. This moisture has led to accelerated corrosion within certain prior art mufflers. The siphon tube 24 of the muffler 10 avoids those problems. In particular, the pressure differential between the outlet tube 58, 78 and either the bottom upstream external chamber 92 or the bottom downstream external chamber 94 is utilized to draw condensed vapor through the siphon tube 24. In this regard, the upstream end 100 of the siphon tube communicates with the bottom upstream external chamber 92, and the pressure differential effectively sucks the moisture through the siphon tube 24 and toward the outlet tube 58, 78 at the downstream end 102 of the siphon tube 24. Condensate accumulating in the bottom downstream external chamber 94 will communicate with the aperture 104 in the siphon tube 24 and will enable condensate to be sucked through the siphon tube 24 and toward the outlet tube 58, 78 at the downstream end 102 of the siphon tube 24.

Figure 5:
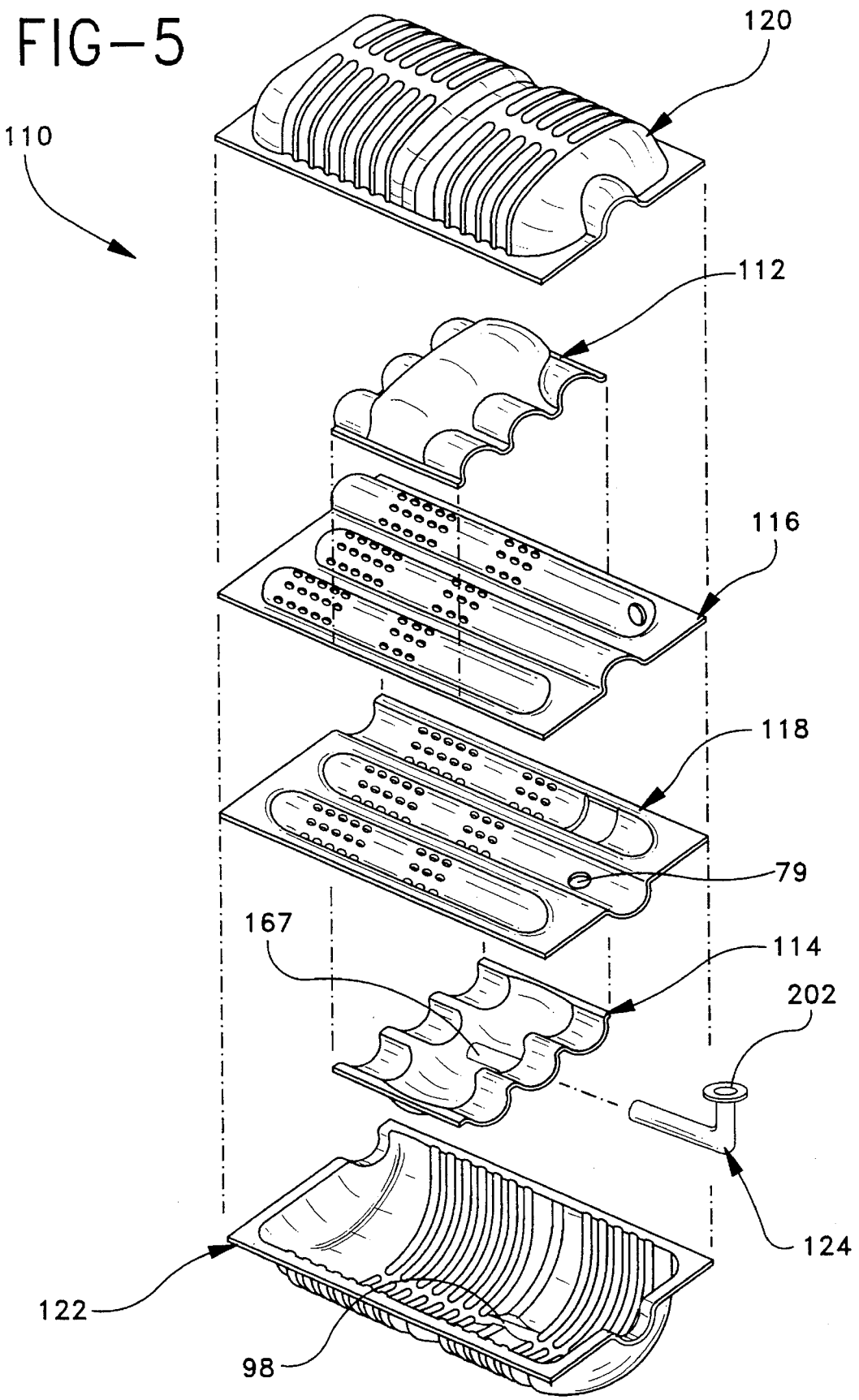
FIG. 5 is an exploded perspective view of an alternate embodiment of the muffler.
Figure 6:
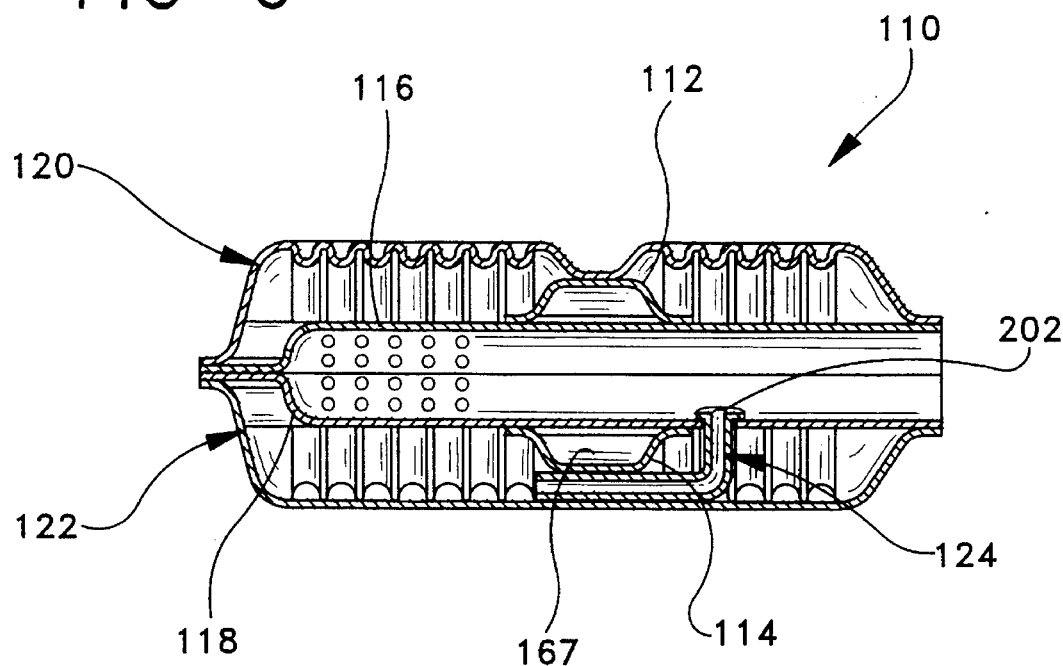
FIG. 6 is a cross-sectional view similar to FIG. 3 but showing the muffler of FIG. 5.
Figure 7:
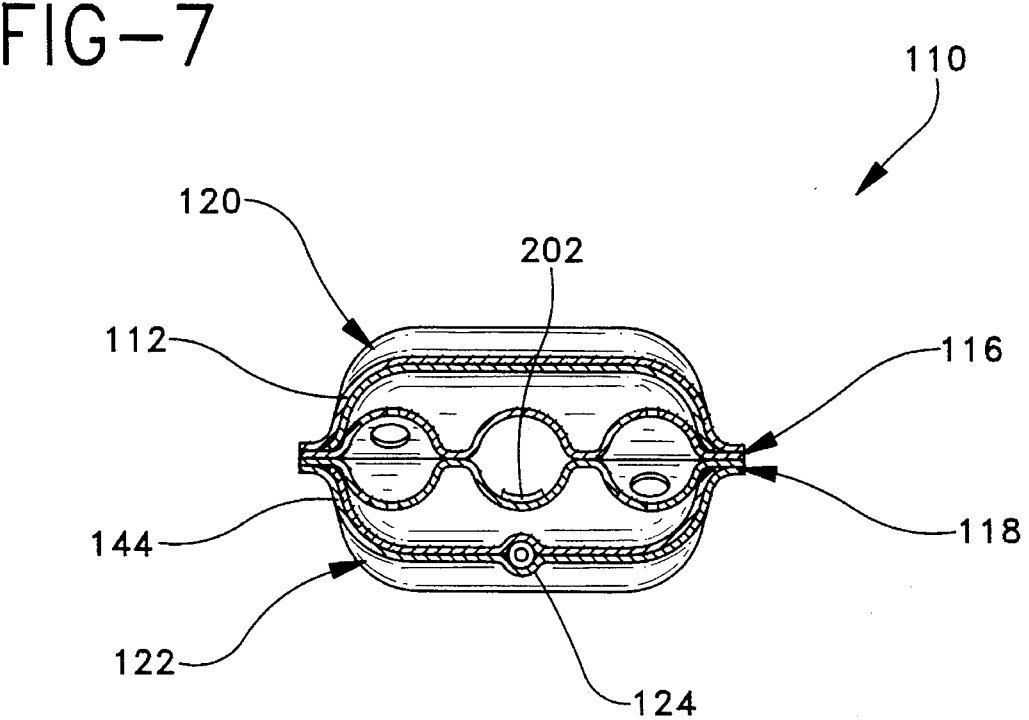
FIG. 7 is a cross-sectional view similar to FIG. 4 but showing the muffler of FIGS. 5 and 6.

An alternate muffler for use with a siphon tube is illustrated in FIGS. 5–7 and is identified generally by the numeral 110. The muffler 110 includes top and bottom formed sheets 112 and 114, top and bottom formed internal plates 116 and 118, top and bottom external shells 120 and 122 and a siphon tube 124. The top and bottom external shells 120 and 122 and the siphon tube 124 are substantially identical to the corresponding components of the muffler 10 described and illustrated above. The muffler 110, however, differs from the muffler 10 in that the top and bottom internal plates 116 and 118 are formed entirely with channels and no internal chamber. The formed sheets 112 and 114 do not define channels, but rather define internal chambers. The bottom internal chamber formed by the bottom sheet 114 is provided with a siphon tube mounting groove 167 that is structurally and functionally comparable to the groove 67 formed in the bottom internal plate 18 of the muffler 10 described and illustrated above.

The top and bottom internal plates 116 and 118 of the muffler 110 are secured directly in face-to-face relationship with one another. The top and bottom sheets 112 and 114 defining the internal chambers are then secured around selected portions of the tubes formed by the top and bottom internal plates 116 and 118. The siphon tube 124 has an upstream flange 202 secured in an aperture 179 in a portion of the outlet tube defined by the bottom internal plate 118. Upstream portions of the siphon tube 124 are then secured in the siphon tube mounting groove 167 formed in the bottom sheet 114. The external shells 120 and 122 are then secured around the internal plates 116 and 118 and the formed sheets 112 and 114. As in the previous embodiment, the groove 198 of the bottom external shell 122 securely engages around portions of the siphon tube 124. The muffler 110 functions exactly as the muffler 10 described and illustrated in greater detail above.

Both embodiments of the mufflers of the subject invention enable the significant manufacturing and performance efficiency achieved with stamp formed mufflers. Additionally, the mufflers of the subject invention enable an efficient siphoning of condensate from a plurality of chambers of the stamp formed muffler. The potential for corrosion can be substantially reduced without providing drain holes through the muffler and without requiring expensive adsorbent materials within the muffler.

While the muffler of the subject invention has been described and illustrated with respect to certain preferred embodiments, it is apparent that various changes can be made without departing from the scope of the invention as defined by the appended claims. For example, many other configurations of tubes and chambers can be provided for communication with the siphon tube. Additionally, mufflers having different gravitational orientations on the vehicle merely require repositioning of the siphon tube to ensure that gravitational low points of the respective chambers communicate with upstream portions of the siphon tube. These and other variations will be apparent to a person skilled in this art after having read the subject disclosure.

We claim:

1. An exhaust muffler comprising:

a plurality of internal components having portions secured in face-to-face relationship and formed to define a plurality of flow tubes and a bottom internal chamber, said flow tubes including an inlet tube and an outlet tube, selected flow tubes being provided with perforation means for permitting communication of exhaust gas between said flow tubes and portions of said muffler adjacent said flow tubes;

top and bottom external shells having peripheral portions secured to said internal components and having formed portions surrounding said flow tubes, said bottom external shell further surrounding and engaging portions of said bottom internal chamber such that the engagement of said bottom external shell and said bottom internal chamber divides said bottom external shell into separate upstream and downstream bottom external chambers, said bottom internal chamber and said bottom external shell being respectively configured to define a siphon tube mounting passage therebetween and connecting said upstream and downstream bottom external chambers; and a siphon tube having opposed upstream and downstream ends, portions of said siphon tube being secured in said siphon tube mounting passage such that said upstream end of said siphon tube is disposed in said upstream bottom external chamber and such that said downstream end of said siphon tube is secured in one said flow tube adjacent said downstream external chamber, whereby pressure differentials between said flow tube and said upstream bottom external chamber causes condensate in said upstream bottom external chamber to be siphoned from said muffler.

2. The muffler of claim 1, wherein said bottom internal chamber and said external shell are formed respective said siphon tube mounting passage closely engage said siphon tube for maintaining said upstream and downstream bottom external chambers in structurally and functionally separate relationship to one another.

3. The muffler of claim 2, wherein said siphon tube mounting passage between said bottom internal chamber and said bottom external shell is formed by a groove in said bottom internal chamber projecting away from said bottom external shell.

4. The muffler of claim 3, wherein said siphon tube mounting passage is further formed by a groove in said bottom external shell registered with said groove in said bottom internal chamber and projecting oppositely therefrom.

5. The muffler of claim 1, wherein portions of said siphon tube in said downstream bottom external chamber have an aperture for evacuating condensate from said downstream bottom external chamber.

6. The muffler of claim 5, wherein said bottom external chambers each define gravitational low points, said siphon tube being disposed to pass through said gravitational low points of said bottom external chambers.

7. The muffler of claim 5, wherein said bottom external shell includes a plurality of reinforcing grooves formed therein, said reinforcing grooves being discontinuous for permitting flow of condensate in said bottom external shell to said gravitational low point of each said bottom external chamber.

8. The muffler of claim 5, wherein said aperture in said siphon tube is formed on a side of said siphon tube substantially adjacent said bottom external shell.

9. The muffler of claim 1, wherein said downstream end of said siphon tube is disposed in the flow tube defining said outlet from said muffler.

10. The muffler of claim 1, wherein portions of said siphon tube adjacent said downstream end are bent to lie substantially internally tangent to one said flow tube and such that the downstream end of said siphon tube faces said outlet of said muffler.

11. The muffler of claim 1, wherein said downstream end of said siphon tube includes an outwardly flared portion, said outwardly flared portion being secured internally in said flow tube.

12. The muffler of claim 1, wherein said internal components include top and bottom internal plates formed to include at least selected ones of said flow tubes, including said inlet tube and said outlet tube, and wherein said bottom internal plates further are formed to define said bottom internal chamber.

13. The muffler of claim 12, wherein the top internal plate is formed to include a top internal chamber generally registered with said bottom internal chamber and communicating with the flow tubes formed by said internal plates.

14. The muffler of claim 10, wherein said internal components further include a pair of sheets formed to define a plurality of flow tubes, said sheets being secured between said internal plates such that said flow tubes formed by said sheets communicate with said flow tubes formed by said internal plates and bridge said internal chambers.

15. The muffler of claim 1, wherein said internal components include top and bottom internal plates formed to define said flow tubes, said internal components further including top and bottom sheets, said bottom sheet being formed to define said bottom internal chamber and being disposed to surround selected flow tubes, said top sheet being formed to define a top internal chamber secured to said top internal plate.

* * * * *